United States Patent
Eguchi

(10) Patent No.: US 12,530,801 B2
(45) Date of Patent: Jan. 20, 2026

(54) IMAGE PROCESSING DEVICE AND IMAGE PROCESSING METHOD

(71) Applicant: Hitachi Astemo, Ltd., Hitachinaka (JP)

(72) Inventor: Akira Eguchi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/876,986

(22) PCT Filed: Jul. 5, 2022

(86) PCT No.: PCT/JP2022/026698
§ 371 (c)(1),
(2) Date: Dec. 19, 2024

(87) PCT Pub. No.: WO2024/009386
PCT Pub. Date: Jan. 11, 2024

(65) Prior Publication Data
US 2025/0378583 A1 Dec. 11, 2025

(51) Int. Cl.
*G06T 7/80* (2017.01)
*G06T 7/215* (2017.01)
(Continued)

(52) U.S. Cl.
CPC ............... *G06T 7/85* (2017.01); *G06T 7/215* (2017.01); *G06T 7/248* (2017.01); *G06V 20/56* (2022.01);
(Continued)

(58) Field of Classification Search
USPC ........................................................ 348/47
See application file for complete search history.

(56) References Cited

U.S. PATENT DOCUMENTS 10,621,433 B1 * 4/2020 Guglielmo ............... G06T 7/579
2013/0004079 A1 1/2013 Yamada et al.
(Continued)

FOREIGN PATENT DOCUMENTS

WO WO-2012/096163 A1 7/2012

OTHER PUBLICATIONS

International Search Report and Written Opinion with English translations of International Patent Application No. PCT/JP2022/026698 dated Sep. 13, 2022 (9 pages).
(Continued)

*Primary Examiner* — Nigar Chowdhury
(74) *Attorney, Agent, or Firm* — Foley & Lardner LLP

(57) ABSTRACT

An image processing device includes: a region dividing unit that divides each of a plurality of captured images captured by an in-vehicle camera into a plurality of divided regions; a feature point detection unit that detects, as a feature point, a portion exceeding a threshold value for each of the divided regions; a threshold value setting unit that sets the threshold value for each of the divided regions so as to evenly distribute the feature points detected in each of the divided regions; a feature point matching unit that performs matching by associating the feature points detected in the plurality of captured images with each other between the plurality of captured images; and a relative parameter calculation unit that calculates a relative parameter on the basis of the feature points associated between the plurality of captured images.

11 Claims, 10 Drawing Sheets

(51) Int. Cl.
G06T 7/246 (2017.01)
G06V 20/56 (2022.01)
G06V 20/64 (2022.01)

(52) U.S. Cl.
CPC .. G06V 20/653 (2022.01); *G06T 2207/10012* (2013.01); *G06T 2207/20021* (2013.01); *G06T 2207/30252* (2013.01)

(56) References Cited

U.S. PATENT DOCUMENTS

2019/0385360 A1* 12/2019 Yang .................. G01C 21/3837
2020/0134337 A1* 4/2020 Okuma ................ G06V 20/584
2020/0150275 A1* 5/2020 Zhu ........................... G06T 7/10

OTHER PUBLICATIONS

Japanese Office Action issued in corresponding JP Application No. 2024-531786, mailed Jun. 24, 2025, with English Translation (8 pages).

* cited by examiner

IMAGE PROCESSING DEVICE AND IMAGE PROCESSING METHOD

TECHNICAL FIELD

The present invention relates to an image processing device and an image processing method.

BACKGROUND ART

In order to use an image processing device to recognize a three-dimensional position in the outside world appearing in an image, it is necessary to calibrate the image processing device. Calibration is performed by calculating camera parameters and relative parameters. The camera parameters are parameters indicating lens distortion, focal length, and the like of cameras used in the image processing device. The relative parameters are parameters indicating relationships between relative positions and postures before and after movement of two cameras or one moving camera.

In a case where a camera for capturing an image is a stereo camera including two cameras, either one of the cameras is used as a reference, and the relationships between the relative position and posture of the other camera with respect to the those of the reference camera are calculated as relative parameters. In addition, taking the position of a right camera as a reference, calculation by the image processing device of the relative three-dimensional position ((x, y, z) axial position) of a left camera with respect to the reference, and of the relative orientation ((x, y, z) axial angle) is referred to as calibration.

As a technique for calibrating an image processing device, the technique disclosed in PTL 1 is known. PTL 1 discloses "selecting an image in which feature points are sufficiently distributed at a distance according to the intended usage of the two cameras, and calculating external parameters of the two cameras by using the image coordinates, in the image, of feature points and corresponding points which are distributed at a distance according to the intended usage of the two cameras".

CITATION LIST

Patent Literature

PTL 1: JP 2009-276233 A

SUMMARY OF INVENTION

Technical Problem

For highly accurate calibration of an image processing device, the distribution of feature points detected from a captured image is important. In the case of a captured image in which the feature point distribution is not suitable for calibration, the accuracy of calibration decreases. In the method disclosed in PTL 1 in which a captured image is determined on the basis of a distance distribution of feature points and in which only a captured image for which a highly accurate calibration result can be expected is extracted to calibrate an imaging device, only a captured image for which a highly accurate calibration result can be expected is extracted. However, in the technique disclosed in PTL 1, a captured image for which the calculated number of feature points is less than a threshold value is not suitable for calibration. Captured images which are not suitable for such a configuration are discarded, and there is the problem that the opportunity to perform calibration is diminished.

The present invention was conceived in view of such a situation, and an object of the present invention is to improve the accuracy of calibration of an image processing device.

Solution to Problem

An image processing device according to the present invention includes: a region dividing unit that divides each of a plurality of captured images captured by an in-vehicle camera into a plurality of divided regions; a feature point detection unit that detects, as a feature point, a portion exceeding a threshold value for each of the divided regions; a threshold value setting unit that sets the threshold value for each of the divided regions so as to evenly distribute the feature points detected in each of the divided regions; a feature point matching unit that performs matching by associating the feature points detected in the plurality of captured images with each other between the plurality of captured images; and a relative parameter calculation unit that calculates a relative parameter on the basis of the feature points associated between the plurality of captured images.

Advantageous Effects of Invention

According to the present invention, the image processing device is capable of more accurately recognizing a three-dimensional position in the outside world by improving the accuracy of the calibration of the image processing device.

DESCRIPTION OF EMBODIMENTS

Hereinafter, modes for carrying out the present invention will be described with reference to the accompanying drawings. In the present specification and the drawings, components having substantially the same function or configuration are denoted by the same reference signs, and thus redundant descriptions thereof are omitted. The present invention is applicable to, for example, an arithmetic device for vehicle control with which an advanced driver assistance system (ADAS) or an in-vehicle electronic control unit (ECU) for autonomous driving (AD) can communicate.

Embodiment

Figure 1:
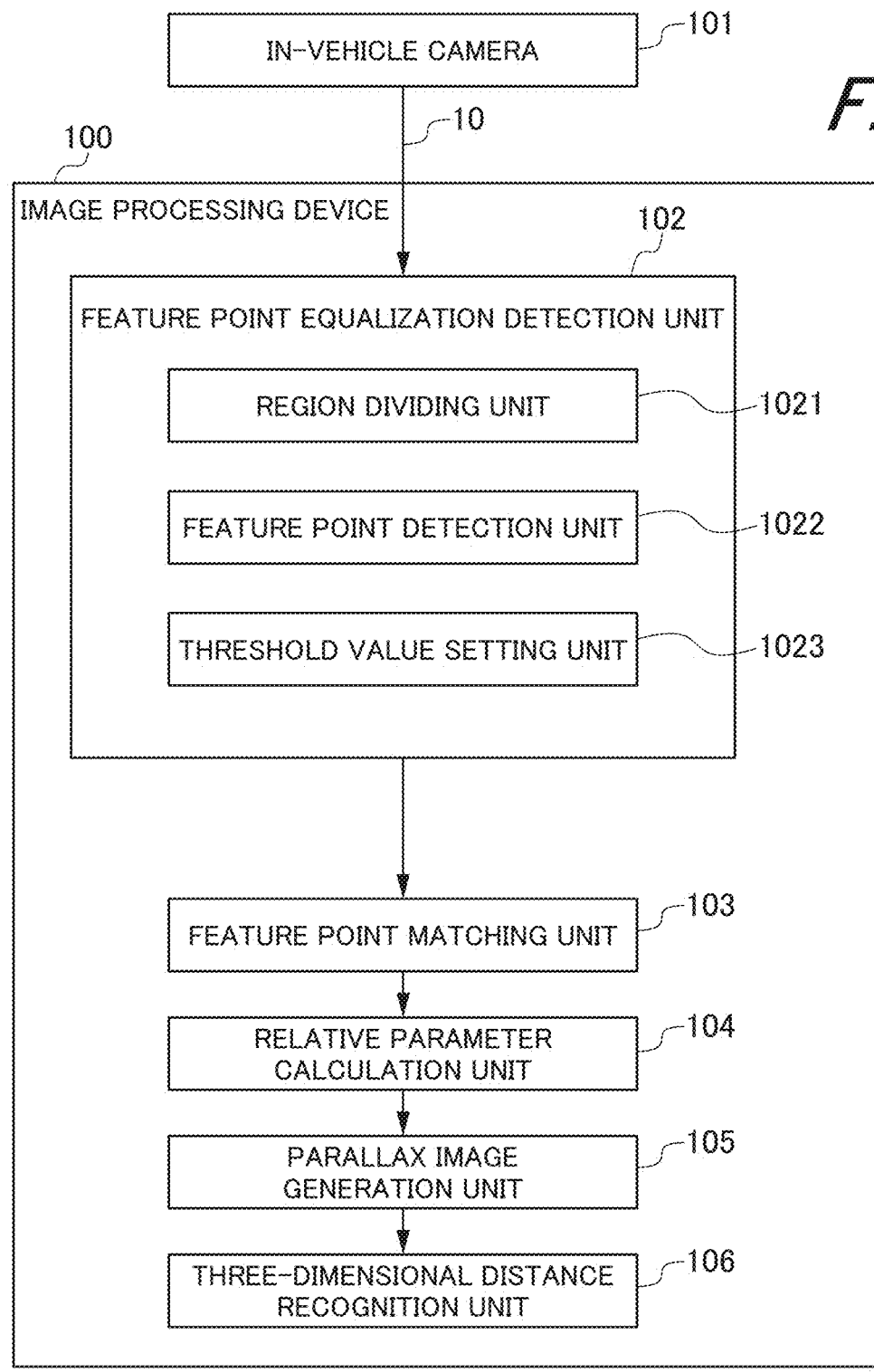
FIG. 1 is a block diagram showing an internal configuration example of an image processing device according to an embodiment of the present invention.

FIG. 1 is a block diagram showing an internal configuration example of an image processing device 100 according to an embodiment.

The image processing device 100 is one of the devices which are mounted in an image processing ECU (not shown) mounted in a vehicle. In addition, the image processing device 100 has a high-accuracy calibration function.

An in-vehicle camera 101 is an example of a camera mounted on the vehicle to enable the image processing device 100 to recognize the outside world of the vehicle, and captures the outside world at a predetermined timing. The in-vehicle camera 101 outputs a captured image 10, which is obtained by capturing the surroundings of the vehicle in order to recognize three-dimensional distances in the outside world, to the feature point equalization detection unit 102 of the image processing device 100. The in-vehicle camera 101 may be two stereo cameras or may be one monocular camera.

The captured image 10 outputted by the in-vehicle camera 101 to the feature point equalization detection unit 102 may be two captured images 10 captured simultaneously by two cameras (stereo cameras), or may be two captured images 10 captured at different times by one camera (monocular camera). In a case where a monocular camera is used as the in-vehicle camera 101, for example, one captured image 10 obtained by the monocular camera capturing an object in a state where the vehicle is stationary and one captured image 10 obtained by capturing the same object after the vehicle moves slightly are outputted.

The image processing device 100 performs processing to calibrate the relative parameters of the in-vehicle camera 101 on the basis of two captured images 10 and recognize three-dimensional distances in the outside world from the captured images 10. Here, the calibration by the image processing device 100 is executed every time the in-vehicle camera 101 is activated. For example, calibration is performed immediately after the power source of the vehicle is turned on and the in-vehicle camera 101 is activated, or at predetermined time intervals while the vehicle is traveling. The image processing device 100 includes a feature point equalization detection unit 102, a feature point matching unit 103, a relative parameter calculation unit 104, a parallax image generation unit 105, and a three-dimensional distance recognition unit 106. Hereinafter, processing by each functional unit will be described with reference to FIG. 2.

Figure 2:
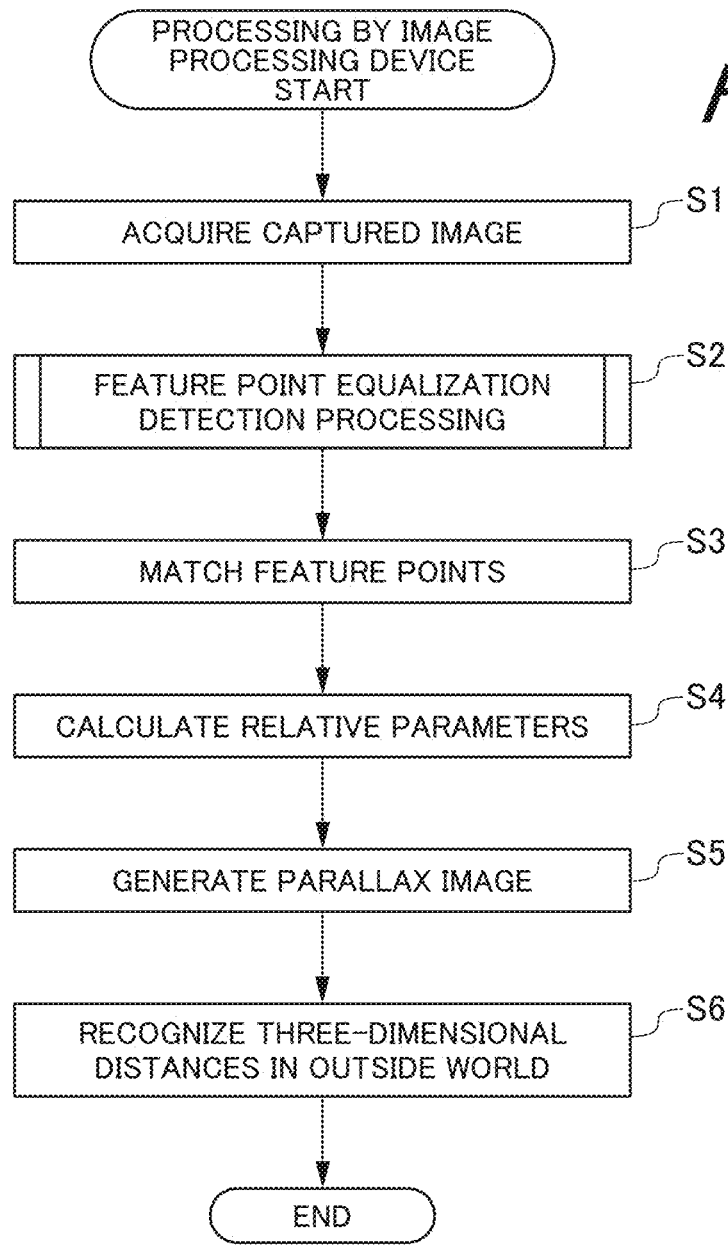
FIG. 2 is a flowchart showing an example of the overall processing by the image processing device according to the embodiment of the present invention.

FIG. 2 is a flowchart showing an example of the overall processing by the image processing device 100. FIG. 2 shows an example of an image processing method of the image processing device 100.

Figure 13:
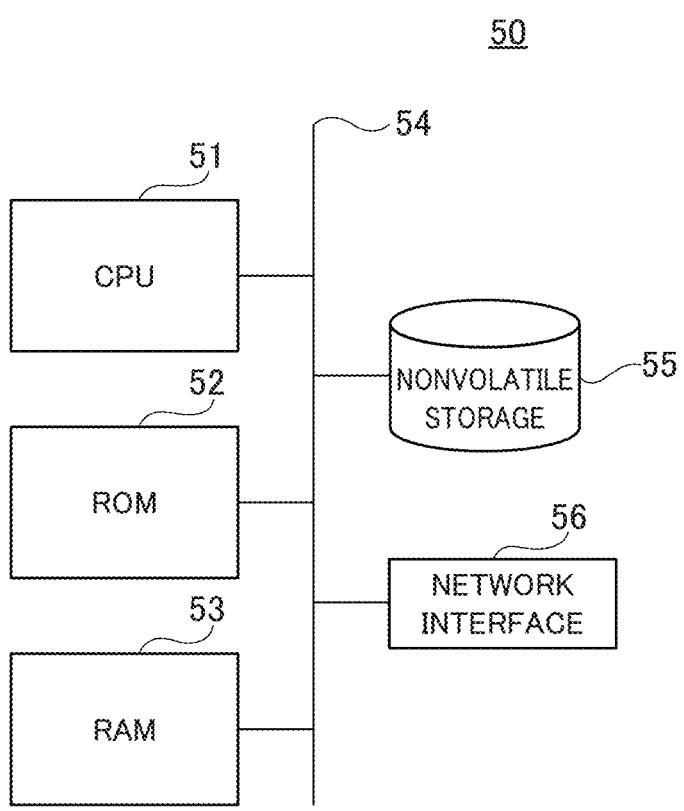
FIG. 13 is a block diagram showing a hardware configuration example of a computer according to the embodiment of the present invention.

First, feature point equalization detection unit 102 acquires the captured image 10 from the in-vehicle camera 101 (S1). The received captured image 10 is stored in a storage device such as a RAM 53 and a nonvolatile storage 55 which are shown in FIG. 13 to be described below, and is, as appropriate, read from the storage device and re-written in the processing by each of the functional units of the image processing device 100. In the following explanation, a description of processing to input and output the captured image 10 to and from the storage device will be omitted.

In step S1, the feature point equalization detection unit 102 analyzes the captured image 10 received from the in-vehicle camera 101, and detects the contour lines of objects (roadways, sidewalks, other vehicles, signs, etc.) appearing in the captured image 10. Thereafter, the feature point equalization detection unit 102 performs the feature point equalization detection processing shown in FIG. 3 (S2) to detect, as feature points, points having a feature such as a corner portion of a contour line or a portion where contour lines intersect.

The feature point equalization detection unit 102 applies a unique method in the feature point equalization detection processing shown in step S2 and performs operations so that feature points for which the accuracy of the relative parameters calculated by the relative parameter calculation unit 104 becomes high are detectable. The operations by the feature point equalization detection unit 102 include processing to divide the captured image 10, processing to detect feature points and count the number of feature points in the regions divided by the division processing, and processing to set threshold values (individual threshold values) to be used in the feature point detection. According to the operation of the feature point equalization detection unit 102, feature points are detected so as to make uniform the number of feature points in each of the divided regions obtained by the captured image 10 being divided by the division processing.

Here, as shown in FIG. 1, the feature point equalization detection unit 102 includes a region dividing unit 1021, a feature point detection unit 1022, and a threshold value setting unit 1023.

The region dividing unit (region dividing unit 1021) divides each of a plurality of captured images 10 captured by the in-vehicle camera (in-vehicle camera 101) into a plurality of divided regions.

The feature point detection unit (feature point detection unit 1022) detects, as feature points, portions exceeding a threshold value (individual threshold value) for each divided region.

The threshold value setting unit (the threshold value setting unit 1023) sets threshold values (individual threshold values) for each of the divided regions so as to evenly distribute the feature points detected in each of the divided regions.

Hereinafter, the feature point equalization detection processing performed by each functional unit included in the feature point equalization detection unit 102 will be described with reference to FIG. 3 and the subsequent drawings.

Figure 3:
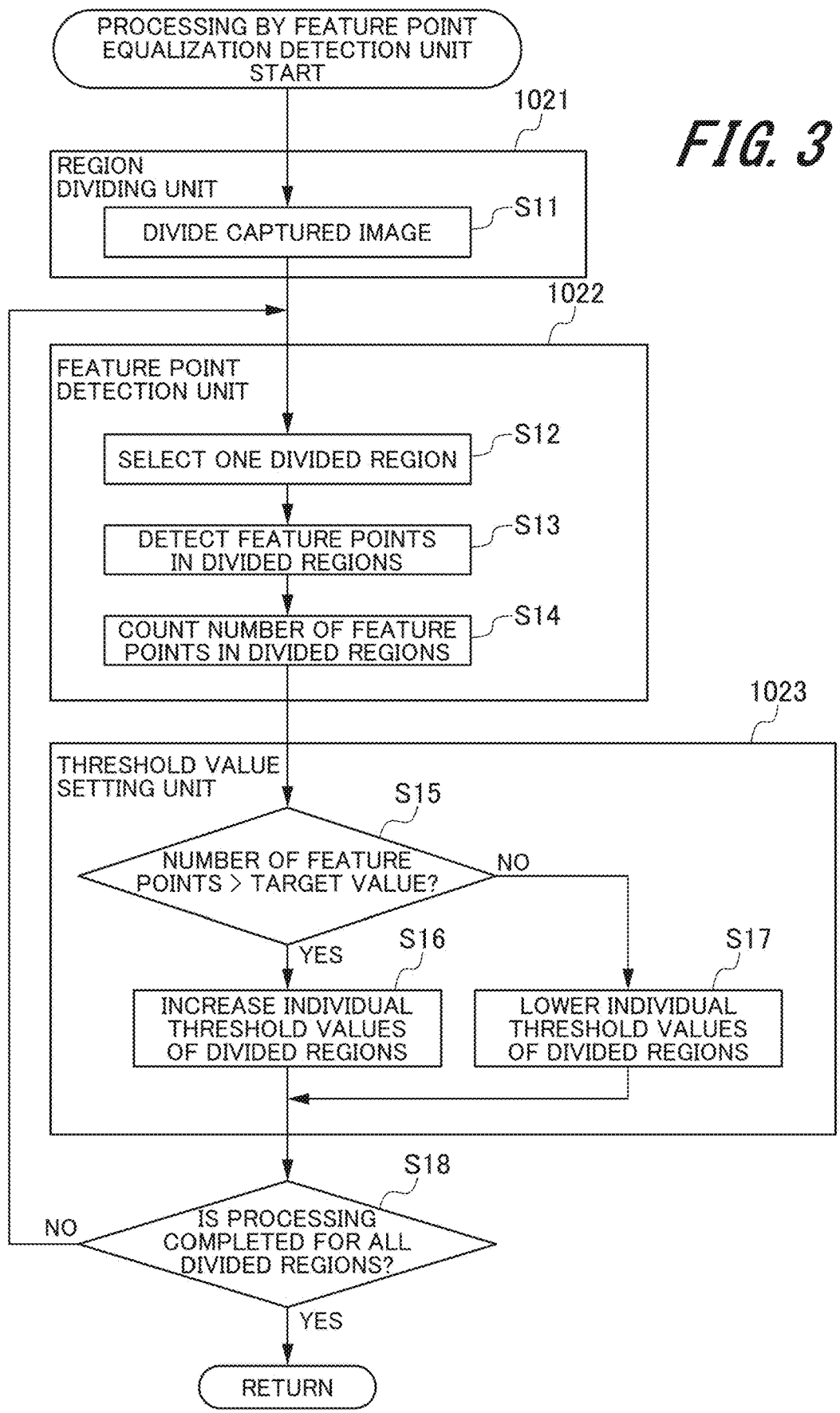
FIG. 3 is a flowchart showing an example of feature point equalization detection processing performed by a feature point equalization detection unit according to the embodiment of the present invention.

FIG. 3 is a flowchart showing an example of the feature point equalization detection processing performed by the feature point equalization detection unit 102. The feature point equalization detection processing forms part of the image processing method performed by each functional unit of the image processing device 100 shown in FIG. 1.

First, the region dividing unit 1021 divides the captured image 10 received from the in-vehicle camera 101 into a predetermined size and a predetermined number of divisions (S11). Here, an example of the processing performed by the region dividing unit 1021 and an example of the divided regions will be described with reference to FIGS. 4 to 8.

For example, the region dividing unit 1021 imports, one by one, two captured images 10 acquired from the in-vehicle camera 101. The region dividing unit (region dividing unit 1021) performs division by increasing the number of divisions of the captured images 10 and reducing the size of the divided regions so that at least one feature point is detected for each divided region. Examples of dividing the captured image(s) 10 include, for instance, the examples shown in FIGS. 4 and 5.

Figure 4:
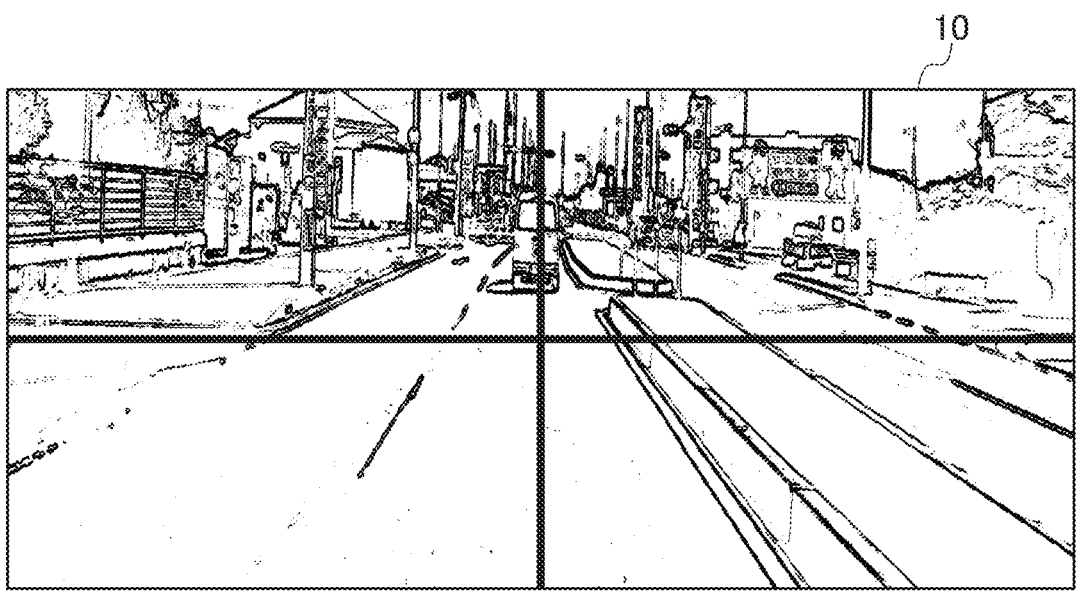
FIG. 4 is a diagram showing an example of an image divided into an equal grid shape according to the embodiment of the present invention.

FIG. 4 is a diagram showing an example of an image (captured image 10) divided into an equal grid shape.

The captured image 10 captured by the in-vehicle camera 101 shown in FIG. 4 is divided by the region dividing unit 1021 into four equal grid-like divided regions in 2 rows×2 columns. In this case, the number of divisions of the captured image 10 is "4". The size of each divided region is the same. By dividing the captured image 10 into four, the size of the divided regions is then ¼ of the size of the original captured image 10. Even in a case where the captured image 10 is to be divided into four as described above, it is to be expected that the feature points in the captured image 10 will be evenly arranged in each divided region, depending on the object.

Figure 5:
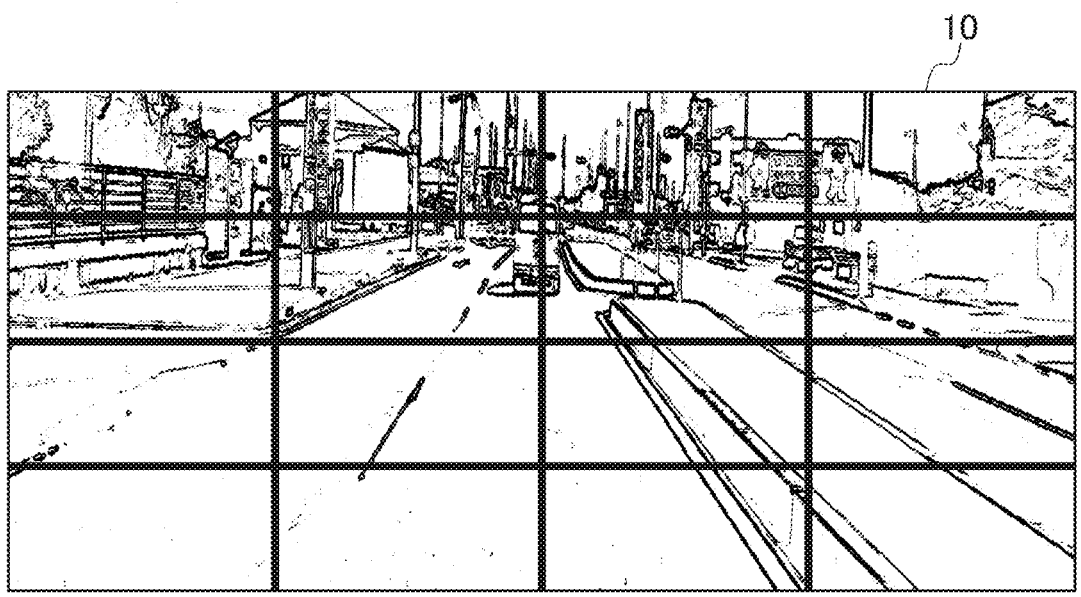
FIG. 5 is a diagram showing an example of an image divided into a grid shape by increasing the number of divisions according to the embodiment of the present invention.

FIG. 5 is a diagram showing an example of an image divided into a grid shape by increasing the number of divisions.

The captured image 10 captured by the in-vehicle camera 101 shown in FIG. 5 is divided by the region dividing unit 1021 into sixteen equal grid-like divided regions of 4 rows×4 columns. In this case, the number of divisions of the captured image 10 is "16". Further, the size of each divided region is the same. By increasing the number of divisions, the size of the divided regions shown in FIG. 5 becomes ¼ of the size of the divided regions shown in FIG. 4. By increasing the number of divisions, the region dividing unit 1021 is capable of evenly arranging, in each divided region, the feature points included in the captured image 10.

The reason why the feature points are evenly arranged in the captured image 10 by the number of divisions of the captured image 10 being increased by the region dividing unit 1021 will now be described. For example, the uneven distribution of feature points present in one region cannot be corrected subsequently. Therefore, in a case where a sign and a vehicle are shown in the upper half of the captured image 10 before division and a roadway is shown in the lower half, it is to be expected that more feature points will be unevenly detected in the upper half of the captured image 10 than in the lower half.

Therefore, because the region dividing unit 1021 increases the number of divisions of the captured image 10 and divides the captured image 10 into small-sized divided regions, even if there is an uneven distribution in the feature points in each of the divided regions, the feature points are evenly arranged in each of the divided regions across the entire captured image 10. For example, when one hundred feature points are randomly arranged across the entire captured image 10, the positions in which the feature points are arranged becomes uneven. This is because when the entire captured image 10 is evenly divided into one hundred equal parts after one hundred feature points are randomly arranged across the entire captured image 10, it is to be expected that divided regions which include one or a plurality of feature points and divided regions which do not include a feature point will be generated. Meanwhile, when the entire captured image 10 is evenly divided into one hundred equal parts and then one feature point is arranged in each divided region, the feature points can be evenly arranged across the entire captured image 10. Therefore, after the captured image 10 is evenly divided, the feature points can be detected in each divided region, and thus the image processing device 100 is capable of performing calibration using the feature points detected across the entire captured image 10.

Figure 6:
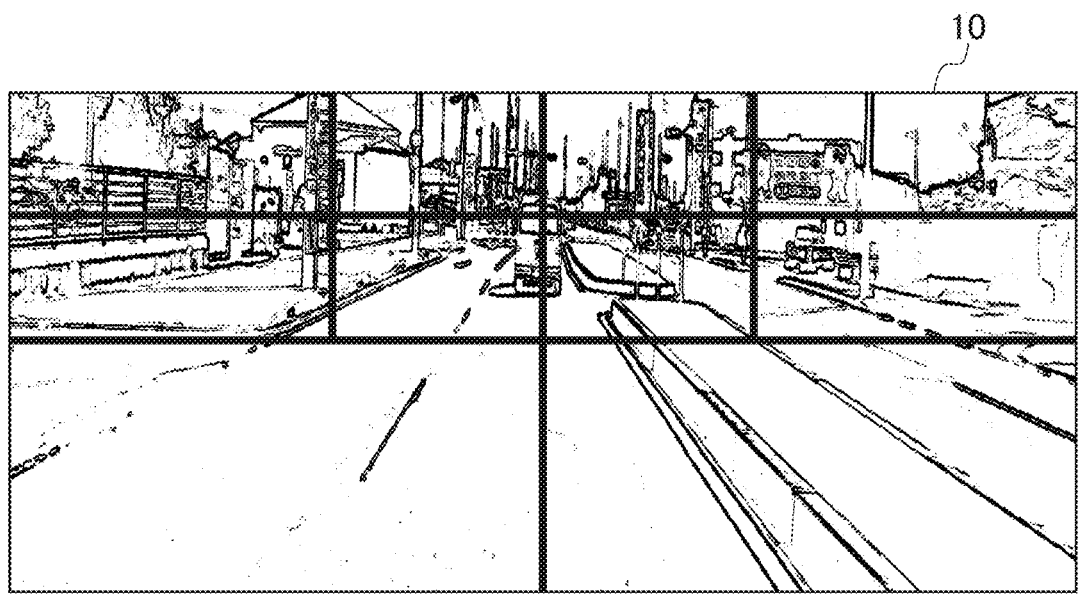
FIG. 6 is a diagram showing an example of a captured image divided according to the status of a vehicle according to the embodiment of the present invention.

FIG. 6 is a diagram showing an example of a captured image 10 divided according to the status of a vehicle.

Considering that the in-vehicle camera 101 is mounted on the vehicle, it is highly likely that an object which is relatively close will appear large on the lower side of the captured image 10, and it is highly likely that a remote object will appear small on the upper side of the captured image 10. Furthermore, in a case where no other vehicle is traveling in front of the vehicle, the lower side of the captured image 10 has a large area within which a road having an even density appears.

Therefore, the region dividing unit (region dividing unit 1021) changes the positions and sizes of the regions into which the captured image 10 is to be divided according to the position in which the in-vehicle camera (in-vehicle camera 101) is mounted. For example, in consideration of the vehicle status and the characteristics of the captured image 10, the region dividing unit 1021 divides the captured image 10 by using large-sized divided regions while reducing the number of divisions in a region of a portion where a nearby object appears large. Meanwhile, the captured image 10 is divided by using a large number of divisions for a portion where a small, remote object appears and by using a small size for the divided regions.

In the example of the division processing shown in FIG. 6, the distance from the vehicle to the object must be recognized in detail by the three-dimensional distance recognition unit 106 (see FIG. 1) in the portion of the captured image 10 corresponding to the direction of travel of the vehicle, which is the long distance portion (the upper half of the captured image 10). In order to recognize feature points from the captured image 10, the region dividing unit 1021 of the feature point equalization detection unit 102 determines the division pattern of the captured image 10 (the number of divisions of divided regions and the division size of each divided region) in consideration of driving scenes such as where and how large feature points appear on average, and how much the feature points in the portion move, and in which direction, over time. Therefore, the region dividing unit (region dividing unit 1021) divides the captured image 10 of a portion predicted to have many feature points by a size smaller than that of the portion predicted to have few feature points. For example, in FIG. 6, the area close to the center of the remote portion (the portion where the roadway appears) is divided using a small size, and the area close to the two ends of the remote portion (the portion where the sidewalk appears) is divided using a large size.

As described above, for regions (a remote roadway, sidewalk, etc.) in which the number of feature points is expected to be small, the region dividing unit 1021 is capable of dividing the captured image 10 by using a larger size than that for regions (a nearby roadway, sidewalk, etc.) in which the number of feature points is expected to be large.

The region dividing unit 1021 changes the number of divisions and the division size in accordance with the characteristics of objects appearing in the captured image 10, and thus the number of feature points detected from a divided region in which a nearby object appears and the number of feature points detected from a divided region in which a remote object appears can be made equally close to each other. As a result, it is possible to improve the calibration accuracy attained by the image processing device 100 in the depth direction of the captured image 10.

Next, an example in which the region dividing unit 1021 performs different division based on images before and after a time series of a traveling vehicle (before a time series A and after time series B) will be described.

Figure 7:
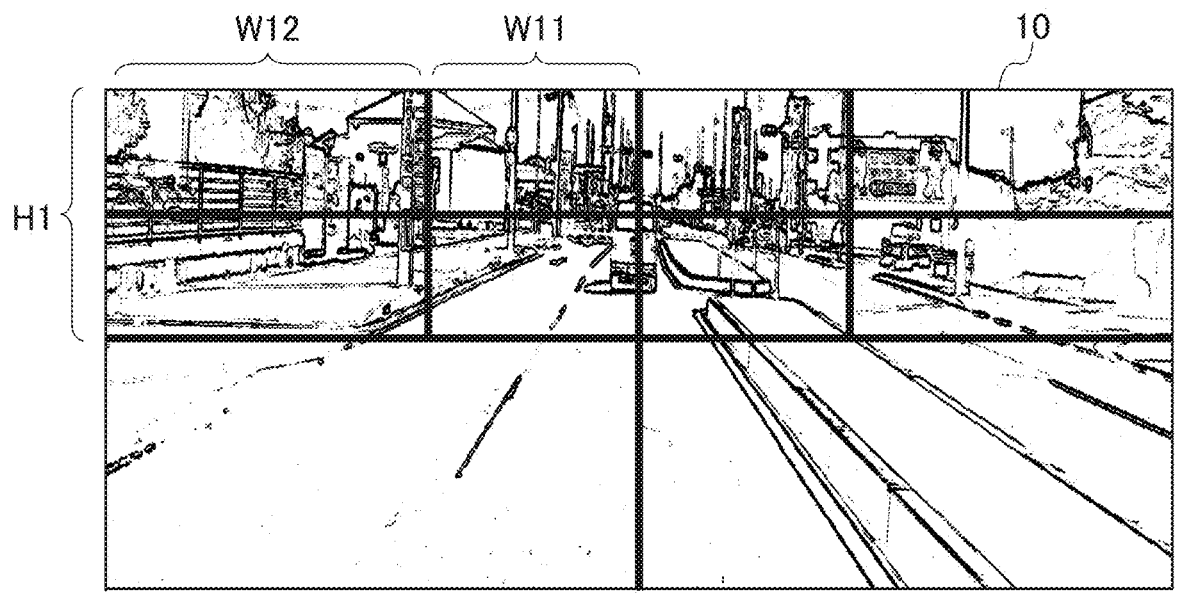
FIG. 7 is a diagram showing a state in which a captured image captured before a time series A according to the embodiment of the present invention is divided.
Figure 8:
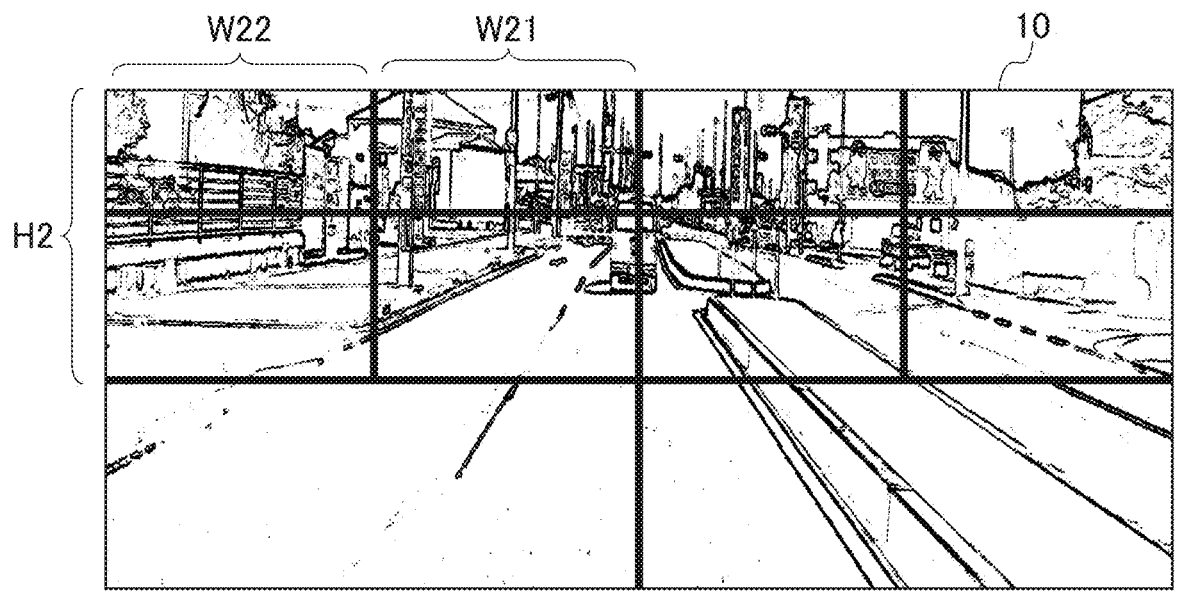
FIG. 8 is a diagram showing a state in which a captured image captured after a time series B according to the embodiment of the present invention is divided.

FIGS. 7 and 8 are diagrams showing examples of captured images 10 captured by the in-vehicle camera 101 at different times.

FIG. 7 is a diagram showing a state in which the captured image 10 captured before time series A is divided.

FIG. 8 is a diagram showing a state in which the captured image 10 captured after the time series B is divided. The captured image 10 shown in FIG. 8 is captured a time t after the captured image 10 captured in FIG. 7. That is, the captured image 10 shown in FIG. 8 is an image captured by the in-vehicle camera 101 in a state where the vehicle has moved forward for the time t.

The region dividing unit (region dividing unit 1021) divides the plurality of captured images 10 into different sizes on the basis of a prediction result of feature points corresponding to three-dimensional positions in the outside world detected from a plurality of captured images 10 captured by the in-vehicle camera (in-vehicle camera 101) as the vehicle moves. For example, the region dividing unit 1021 predicts where feature points corresponding to the three-dimensional positions detected from the captured image 10 captured at pre-time series A and the captured image 10 captured at post-time series B, respectively, are located. The region dividing unit 1021 divides the two captured images 10 using different division sizes so that the predicted positions of the feature points are included.

When the captured image shown in FIG. 7 is compared with the captured image 10 shown in FIG. 8, the height H1 of the upper region divided into eight divided regions in the image shown in FIG. 7 is the height H2 in the captured image 10 shown in FIG. 8, and the upper region of the captured image 10 is wider. In addition, the region on the left side of the image shown in FIG. 7 is divided by a width W11 including a roadway which is remote and a width W12 of a region including a sidewalk which is remote. Meanwhile, when the captured image 10 shown in FIG. 8 is captured, the vehicle moves forward and approaches the object. Therefore, the region on the left side of the image shown in FIG. 8 is wider than the width W11 shown in FIG. 7 as indicated by the width W21 including the remote roadway. Meanwhile, width W22, which includes the remote sidewalk in the region on the left side of the image shown in FIG. 8, is narrower than width W12 shown in FIG. 7.

Note that, in order to perform matching of divided regions of the captured image 10 captured at pre-time series A and the captured image 10 captured at post-time series B, divided regions of the captured image 10 captured at pre-time series A and divided regions of the captured image 10 captured at post-time series B must be present. Therefore, the number of divisions of the two captured images 10 is the same.

Because the region dividing unit 1021 changes the division size of the captured image 10 before and after the time series in this manner, the feature point detection unit 1022 is capable of reliably detecting feature points in the region where a noteworthy object in the direction of travel of the vehicle is present (for example, a roadway). In addition, when matching divided regions, the feature point matching unit 103 to be described below is capable of minimizing malfunctions in matching erroneous divided regions.

Returning again to FIG. 3, the description will be continued.

After the processing of step S11, the feature point detection unit 1022 selects one divided region resulting from the division by the region dividing unit 1021 (S12). The feature point detection unit 1022 performs feature point detection in the divided regions by using the individual threshold value for the divided region selected in step S12 (S13).

In feature point detection processing, detection threshold values for increasing or decreasing the number of feature points detected in the divided regions by the feature point detection unit 1022 is used. Usually, one value is set as the detection threshold value for feature points for one captured image 10. Meanwhile, the feature point detection unit 1022 according to the present embodiment is capable of individually setting a detection threshold value for each divided region. Therefore, the detection threshold value set for each divided region is referred to as an "individual threshold value". The individual threshold value is a value set for each divided region by the threshold value setting unit 1023 described below.

Further, the individual threshold values set by the threshold value setting unit 1023 have a range of settable values. Here, luminance threshold values are used as the individual threshold values. By using luminance threshold values, it is possible to perform binarization processing for each pixel such that white is displayed in regions having a certain luminance or more and black is displayed in regions having a luminance less than the certain luminance. For example, increasing the luminance threshold value increases the black region in the captured image 10, and decreasing the luminance threshold value increases the white region in the captured image 10. When the luminance threshold value is increased to the maximum value, the captured image 10 is completely filled black, and when the luminance threshold is decreased to the minimum value, the captured image 10 is completely filled white. Therefore, a feature point cannot be detected in either case. Therefore, the range of the luminance threshold values which are effective for feature point detection is determined for each operation scene. The threshold value setting unit 1023 increases or decreases the individual threshold values within this range.

After step S13, the feature point detection unit 1022 counts the number of feature points in the divided regions detected in step S13 (S14). The number of feature points of the divided regions counted by the feature point detection unit 1022 is temporarily stored in the RAM 53 (see FIG. 13) or the like.

After the processing (S12 to S14) by the feature point detection unit 1022, the processing by the threshold value setting unit 1023 is started. The threshold value setting unit 1023 sets a threshold value to equalize the feature points detected by the feature point detection unit 1022. Therefore, the threshold value setting unit 1023 compares the number of feature points with a target value for each divided region for which the number of feature points has been counted in step S14, and determines whether or not the number of feature points is greater than the target value (S15). In steps S15 to S17, the threshold value setting unit (threshold value setting unit 1023) performs setting to raise the threshold values set for divided regions in which the number of feature points is greater than the target value, and performs setting to lower the threshold values set for divided regions in which the number of feature points is less than the target value. For this reason, the individual threshold values are set such that the number of feature points detected by the feature point detection unit 1022 is close to the target value. Here, the number of feature points will be described with reference to FIGS. 9 and 10.

Figure 9:
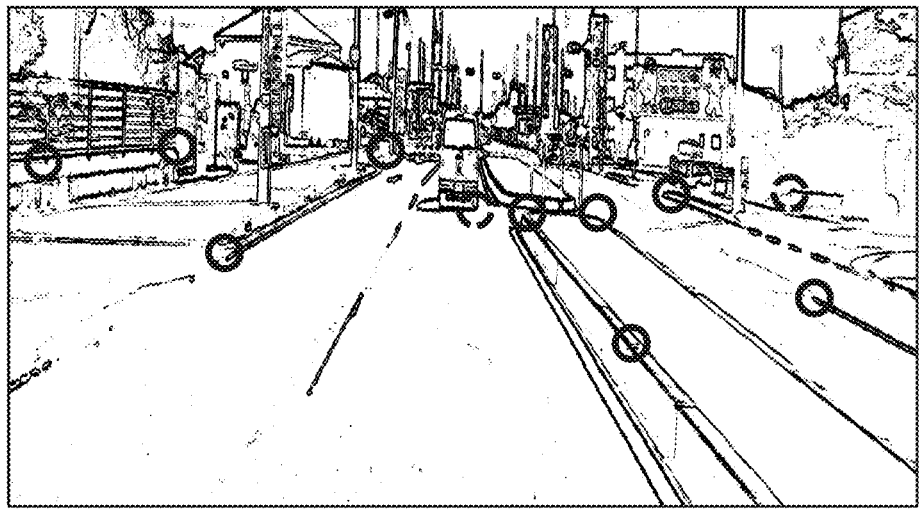
FIG. 9 is a diagram showing an example of feature points detected from a first captured image according to the embodiment of the present invention.

FIG. 9 is a diagram showing an example of feature points detected from the first captured image 10.

Figure 10:
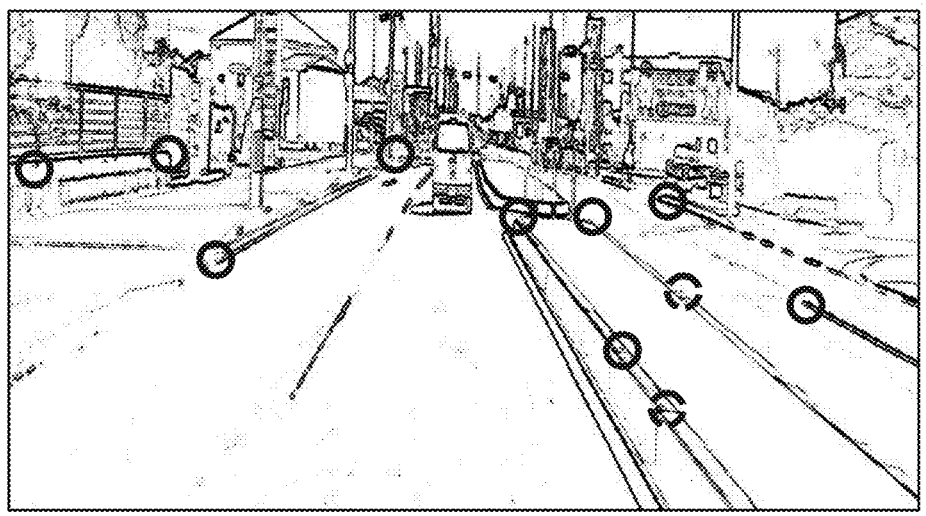
FIG. 10 is a diagram showing an example of feature points detected from a second captured image according to the embodiment of the present invention.

FIG. 10 is a diagram showing an example of feature points detected from the second captured image 10.

The solid-line circles and broken-line circles shown in FIGS. 9 and 10 represent feature points. However, a solid-line circle represents a feature point for which a feature point indicating the same part has been detected and matched in two captured images 10, and a broken-line circle represents a feature point which has not been detected in the same part from the two captured images 10.

Normally, the feature point matching is performed by an operation to compare the feature amounts of one feature point of one captured image 10 (standard image) with the feature amounts of all feature points of the other captured image 10 (reference image) to find the feature point having the closest feature amount. The feature amount is a numerical value indicating the shape of a feature point, and is obtained by converting the arrangement of pixels (luminance values) around the feature point into a numerical value by using a certain procedure. Various shapes are assumed for the feature points; however, if the feature points are the same object, the feature points are expected to be the same. However, because the matching of the feature points is performed on the divided regions in the same position in the two captured images 10, the load can be made lighter than in the processing to match the feature points detected across the entire captured image 10, and thus the time until completion of the matching can be shortened.

The description returns to FIG. 3.

It is assumed that the upper left side (toward the back) of the captured image 10 shown in FIG. 9 is a divided region obtained through division using the division pattern shown in FIG. 6. In this case, because many feature points have been detected in the divided region on the upper left side (toward the back) of the captured image 10, the threshold value setting unit 1023 determines that the number of feature points in this divided region is greater than the target value (NO in S15). Therefore, the threshold value setting unit 1023 performs processing to increase the individual threshold values (S16). As a result, the detection threshold value in the divided region reaches a maximum value. That is, the detection threshold value is the maximum detection threshold value within the settable range. However, by dividing the current individual threshold value to the maximum value at predetermined intervals, the individual threshold values may be set at the intervals with which division is performed in step S16. Therefore, the individual threshold value may be set to a value smaller than the maximum value.

Meanwhile, it is assumed that the lower side (toward the front) of the captured image 10 shown in FIG. 9 is a divided region obtained through division using the division pattern shown in FIG. 6. In this case, because almost no feature point is detected in the divided region on the lower side (front side) of the captured image 10, the threshold value setting unit 1023 determines that the number of feature points in this divided region is equal to or less than the target value (NO in S15). Therefore, the threshold value setting unit 1023 performs processing to lower the feature point detection threshold value (S17). As a result, the detection threshold value in the divided region reaches the minimum value. That is, the detection threshold value is the minimum detection threshold value within the settable range. However, by dividing the current individual threshold value to the minimum value at predetermined intervals, the individual threshold values may be set at the intervals with which division is performed in step S17. Therefore, the individual threshold value may be set to a value greater than the minimum value.

After step S16 or S17, the feature point equalization detection unit 102 determines whether or not the processing of step S12 and subsequent steps has been performed on all the divided regions divided by the region dividing unit 1021 (S18). In a case where it is determined that there is a divided region that has not been processed (NO in S18), the feature point equalization detection unit 102 re-executes the processing from step S12 on the unprocessed divided region. Here, the feature point detection unit (feature point detection unit 1022) detects the feature points by using the threshold value set by the threshold value setting unit (threshold value setting unit 1023). Therefore, the number of feature points detected by the feature point detection unit 1022 is made to correspond to the target value. Meanwhile, in a case where it is determined that the processing has been performed on all the divided regions (YES in S18), the feature point equalization detection unit 102 ends the feature point equalization detection processing shown in FIG. 3.

Note that, in the feature point equalization detection processing shown in FIG. 3, after the individual threshold value is set for a certain divided region by means of the processing of steps S16 and S17, the feature point detection unit 1022 performs the feature point detection processing on another divided region by using the individual threshold value set in the previous processing. Such processing is performed in order to shorten the processing time for all the divided regions in a case where the feature point equalization detection processing shown in FIG. 3 is implemented.

However, if the image processing device 100 has spare processing capacity, it is more effective for the feature point detection unit 1022 to perform the feature point detection again in the same divided region. In this case, based on the individual threshold value set by the threshold value setting unit 1023 for a certain divided region, the feature point detection unit 1022 uses the set individual threshold value to re-detect the feature points in the same divided region. Thereafter, the individual threshold value setting processing by the threshold value setting unit 1023 is not performed, and the processing from step S12 may be performed on another divided region.

Returning to FIGS. 1 and 2, the description will be continued.

After the processing by the feature point equalization detection unit 102 shown in FIG. 3, the feature point matching unit (feature point matching unit 103) performs matching by associating the feature points detected in the plurality of captured images 10 with each other between the plurality of captured images 10 (S3). At this time, the feature point matching unit 103 performs matching to associate feature points detected as the same portion in the two captured images 10 outputted from the feature point equalization detection unit 102. Therefore, the feature point matching unit 103 is capable of matching the feature points detected in the two captured images 10 before division as in a conventional case.

Note that, in a case where divided regions are generated by dividing the two captured images 10, the feature point matching unit (feature point matching unit 103) performs matching by associating feature points for each divided region having the same position in the plurality of captured images 10. Therefore, the feature point matching unit 103 is capable of performing matching through association with feature points uniformly detected across the entire captured image 10, as compared with conventional processing in which matching is performed by associating feature points by taking the entire captured image 10 as a target.

The feature point matching processing is as described above with reference to FIGS. 9 and 10. For example, the feature point matching unit 103 utilizes the divided region divided by the region dividing unit 1021, and changes one feature point in the divided region in one captured image 10 to compare the feature point in the divided region corresponding to the other captured image 10. Because the range of the divided regions to be matched is limited by such processing, the feature point matching unit 103 is capable of avoiding erroneous matching with a feature point detected in another divided region, and thus the time required for the matching operation can be shortened.

The relative parameter calculation unit (relative parameter calculation unit 104) calculates relative parameters on the basis of the feature points associated among the plurality of captured images 10 (S4). Therefore, the relative parameter calculation unit 104 calculates relative parameters by using the camera parameters and the matched feature points. The relative parameters are parameters indicating the relationships between the relative positions and postures of one camera relative to another camera before and after movement of two in-vehicle cameras 101 or one moving in-vehicle camera 101. Further, when calculating the relative parameters, the relative parameter calculation unit 104 performs calculation so as to minimize the sum of reprojection errors of all the feature points matched in the two captured images 10.

Here, in a case where the in-vehicle camera (in-vehicle camera 101) is a stereo camera, the relative parameter calculation unit (relative parameter calculation unit 104) uses, as references, the axial position and the axial angle of one of two cameras constituting the stereo camera when the one camera captures a captured image 10, and uses, as the relative parameters, the relative axial position and the relative axial angle of the other camera when the other camera captures the other captured image 10. For example, taking the position of a right camera as a reference, a relative three-dimensional position ((x, y, z) axial position) of a left camera with respect to the reference, and a relative orientation ((x, y, z) axial angle) are used as the relative parameters.

Note that, in a case where the in-vehicle camera 101 is a monocular camera, captured images 10 which are captured before and after the movement of one moving in-vehicle camera 101 are used. However, the posture of the monocular camera hardly becomes constant before and after the movement. For example, under an ideal condition where the vehicle travels straight on a straight line, the posture of the in-vehicle camera 101 is constant. However, it is assumed that the posture of the in-vehicle camera 101 changes because the angle of the in-vehicle camera 101 actually changes to the left and right due to a minute steering wheel operation or because the angle of the in-vehicle camera 101 changes up and down as a result of application of the brakes or accelerator.

Therefore, in a case where the in-vehicle camera (in-vehicle camera 101) is a monocular camera, the relative parameter calculation unit (relative parameter calculation unit 104) uses, as references, the axial position and the axial angle of the monocular camera at the time of capturing one captured image 10 among a plurality of captured images 10 captured by the monocular camera as the vehicle moves, and uses, as relative parameters, the relative axial position and the relative axial angle of the monocular camera at the time of capturing the other captured image 10. For example, taking the position of a monocular camera captured at a certain moment as a reference, a relative three-dimensional position ((x, y, z) axial position) with respect to a reference of the monocular camera captured after a time t, and a relative orientation ((x, y, z) axial angle) are used as the relative parameters. As a result, even in a case where a monocular camera is used as the in-vehicle camera 101, the relative parameters are correctly calculated.

Next, the parallax image generation unit (parallax image generation unit 105) generates a parallax image of the plurality of captured images 10 on the basis of the relative parameters (S5). Therefore, the parallax image generation unit 105 creates a parallelized image which is obtained by parallelizing the two captured images 10 on the basis of the relative parameters. In the parallelized image, the epipolar line is horizontal and has the same Y coordinate. The parallax image generation unit 105 then performs stereo matching on the parallelized image to generate a parallax image.

Next, the three-dimensional distance recognition unit (three-dimensional distance recognition unit 106) recognizes three-dimensional distances in the outside world on the basis of the parallax image (S6). For example, the three-dimensional distance recognition unit 106 calculates three-dimensional distances in the outside world on the basis of the parallax value of the parallax image generated by the parallax image generation unit 105, the focal length of the camera included in the camera parameters, the pixel size of the light receiving element included in the in-vehicle camera 101, and the like, and recognizes objects in the outside world. Thereafter, the processing by the image processing device 100 ends.

As described above, even in a case where the in-vehicle camera 101 includes one monocular camera, the three-dimensional distance recognition unit 106 is capable of calculating the three-dimensional distances in the outside world and recognizing objects in the outside world. In this case, the in-vehicle camera 101 is required to capture an image of the outside world at timing before and after the vehicle moves in time series, and how the in-vehicle camera 101 has moved between the two captured images 10 must be accurately known. Note that, if the in-vehicle camera 101 includes two stereo cameras, the camera positions of the two captured images 10 captured by the stereo cameras are fixed and can be accurately known. Meanwhile, because the camera position before and after the movement of one monocular camera that moves together with the vehicle tends to be subject to a large error, the recognition accuracy of three-dimensional distances in the outside world is reduced as compared with the case of using a stereo camera.

However, there is an advantageous effect in that three-dimensional distances can be recognized using one camera.

Although the functional units included in the image processing device 100 have been described above, the advantageous effects in a case where the technique according to the present embodiment is applied and the feature point equalization detection unit 102 equalizes the feature points will be described. Therefore, an example of a parallelized image generated by the parallax image generation unit 105 after the relative parameter calculation unit 104 calculates the relative parameters will be described with reference to FIGS. 11 and 12.

Figure 11:
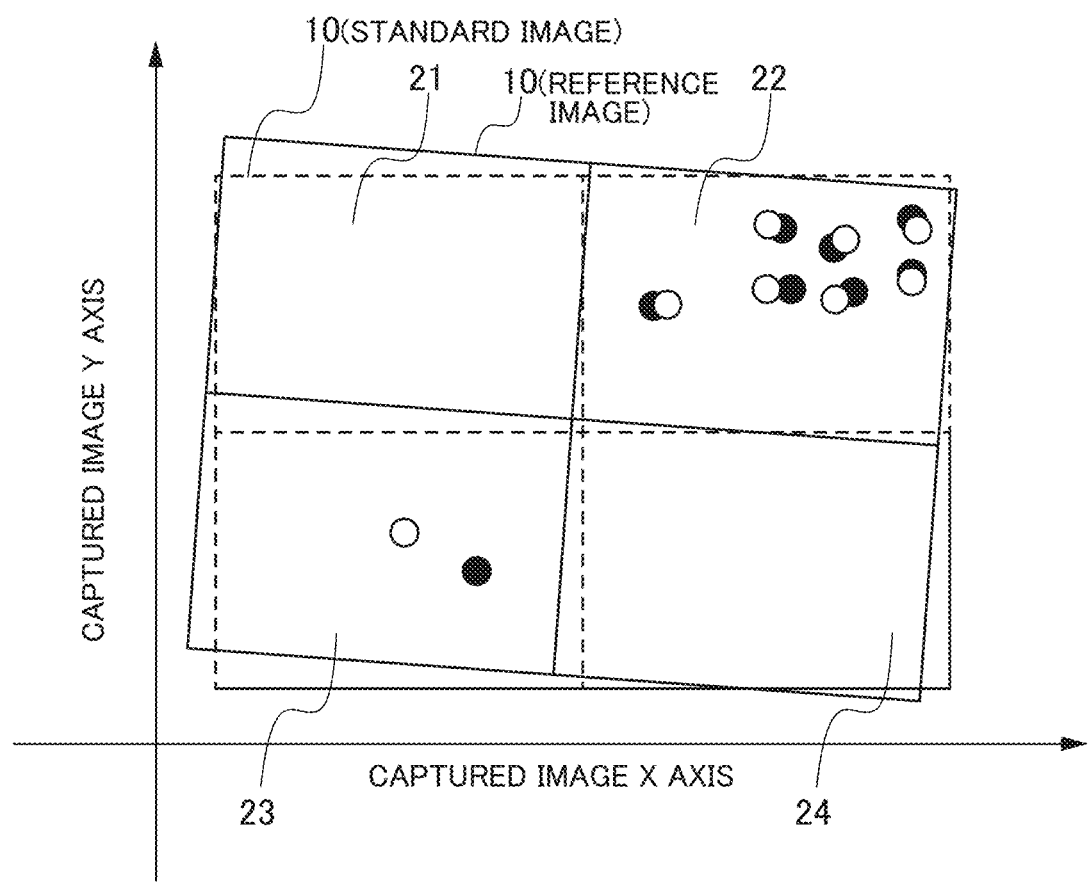
FIG. 11 is a diagram showing an example of a parallelized image to which a conventional technique is applied and in which a distribution of feature points is biased.

FIG. 11 is a diagram showing an example of a parallelized image to which a conventional technique is applied and in which a distribution of feature points is biased. In FIG. 11, the horizontal axis represents the X axis of the captured image 10, and the vertical axis represents the Y axis of the captured image 10.

The black circles and the dashed ruled lines shown in the drawing indicate the feature points detected from the captured image 10 (reference image) captured by one camera, and the inclination of the parallelized image. Furthermore, the white circles and solid ruled lines shown in the drawings indicate the feature points and inclination of the parallelized image detected from the captured image 10 (reference image) captured by the other camera. Ideally, two parallelized images after parallelization are expected to have the same inclination. Here, the two captured images 10 are divided into regions 21 to 24 in 2 rows×2 columns.

In the example of the parallelized image shown in FIG. 11, when the relative parameters are calculated so as to minimize the reprojection errors, weights are calculated for the feature points. Weights are values integrated for errors of feature points detected from a two-dimensional captured image 10 (the errors between the white circles and the black circles shown in the drawing). In regions having many feature points, even if the error of one feature point is small, the errors of many feature points are integrated, and thus the weight of the feature point with respect to the evaluation value increases. Meanwhile, in a region where the number of feature points is small, errors of a small number of feature points are integrated, and thus, even if the error of one feature point is large, the weight of the feature point with respect to the evaluation value becomes small.

Based on such a relationship between the feature points and the weights, the weight in the relative parameter calculation for region 22 in which feature points are dense shown in FIG. 11 increases, and the weight for region 23 in which feature points are sparse decreases. Therefore, in the relative parameter calculation, relative parameters which are optimized for regions having a large weight and in which feature points are dense are calculated, and a large deviation occurs in region 23 where the feature points are sparse. As a result, the captured image 10 (reference image) indicated by the solid line is not significantly inclined and parallelized with respect to the captured image 10 (standard image) indicated by the broken line.

Figure 12:
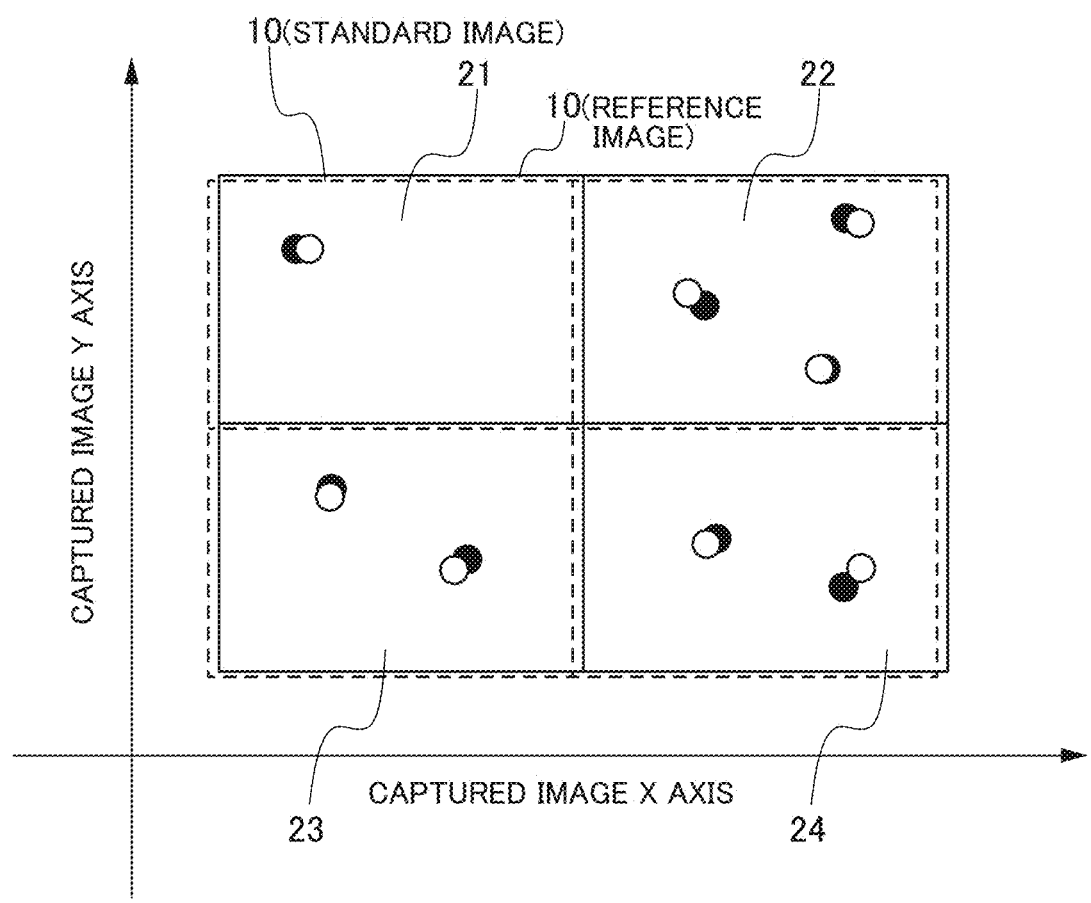
FIG. 12 is an example of a parallelized image in which the distribution of feature points is equalized by applying the technique according to the embodiment of the present invention.

FIG. 12 is an example of a parallelized image in which the distribution of feature points is equalized by applying the technique according to the present embodiment.

Also in FIG. 12, the black circles, white circles, and dashed and solid ruled lines shown in the drawing are similar to those shown in FIG. 11.

In the example of the parallelized image shown in FIG. 12, the feature points are evenly distributed in regions 21 to 24 (entire image) of the two captured images 10. Therefore, the weights in the calculation of the relative parameters are also equalized in the two captured images 10. As a result, a calculation result with less distortion can be obtained. In addition, the captured image 10 (reference image) indicated by the solid line is collimated with the inclination suppressed with respect to the captured image 10 (standard image) indicated by the broken line.

Next, a hardware configuration of the computer 50 constituting the image processing device 100 will be described.

FIG. 13 is a block diagram showing a hardware configuration example of a computer 50. The computer 50 is an example of hardware which is used as a computer capable of operating as the image processing device 100 according to the present embodiment. As a result of the computer 50 (computer) executing a program, the image processing device 100 according to the present embodiment implements an image processing method which is performed by the respective functional blocks shown in FIGS. 1 and 3 cooperating with each other.

The computer 50 includes a central processing unit (CPU) 51, a read only memory (ROM) 52, and a random access memory (RAM) 53 which are each connected to a bus 54. The computer 50 further includes a nonvolatile storage 55 and a network interface 56.

The CPU 51 reads the program code of software for implementing each function according to the present embodiment from a ROM 52, loads the program code into a RAM 53, and executes the program code. Variables, parameters, and the like generated during arithmetic processing by the CPU 51 are temporarily written to the RAM 53, and these variables, parameters, and the like are read, as appropriate, by the CPU 51. However, a micro processing unit (MPU) may be used instead of the CPU 51.

As the nonvolatile storage 55, for example, a hard disk drive (HDD), a solid state drive (SSD), a flexible disk, an optical disk, a magneto-optical disk, a CD-ROM, a CD-R, a magnetic tape, a nonvolatile memory, or the like is used. In addition to an operating system (OS) and various parameters, a program for causing the computer 50 to function is recorded in the nonvolatile storage 55. The ROM 52 and the nonvolatile storage 55 record programs, data, and the like necessary for the CPU 51 to operate, and are used as an example of a computer-readable, non-transitory storage medium that stores a program executed by the computer 50.

For example, a network interface card (NIC) or the like is used as the network interface 56, and various data can be transmitted and received between devices via a local area network (LAN), a dedicated line, or the like connected to a terminal of the NIC.

In the image processing device 100 according to the embodiment described above, when the feature points are detected from a captured image 10, the operation is performed so that the detected feature points have a distribution within the captured image 10 which is suitable for calibration, and thus the calibration (calculation of the relative parameters) can be more accurately performed. Therefore, the three-dimensional distance recognition unit 106 included in the image processing device 100 is capable of recognizing three-dimensional positions represented by three-dimensional distances in the outside world more accurately than conventionally.

Here, the two captured images 10 used for matching are divided by the region dividing unit 1021 using the same size and number of divisions. The captured image 10 is divided into divided regions such that at least one feature point is detected. Therefore, the feature points are evenly arranged in each divided region, and thus the feature points are evenly arranged throughout the entire captured image 10. In addition, matching of feature points is easily performed for each divided region in the same position of each captured image 10.

Furthermore, the size of the divided region is changed according to the number of feature points predicted for each portion of the captured image 10. The captured image 10 is divided so that the size of a portion predicted to have a large number of feature points is small and the size of a portion predicted to have a small number of feature points is large. As a result, at least one feature point is detected even in a portion predicted to have a small number of feature points.

In addition, the individual threshold value for detecting the feature points can be changed for each divided region. Therefore, the number of detected feature points is can be reduced by setting high individual threshold values for portions predicted to have a large number of feature points. Conversely, the number of detected feature points can be increased by setting low individual threshold values for portions predicted to have a small number of feature points. As a result, the numbers of feature points detected in each divided region are equalized.

In addition, because the arrangement of the feature points is uneven, even a captured image 10 that conventionally would have been discarded can be used for the calibration by the image processing device 100. Therefore, the image processing device 100 has more opportunities to perform calibration, and is capable of performing calibration more frequently and accurately than conventionally.

[Modification]

Note that, in a case where a failure occurs in one of the cameras included in the stereo camera, calibration may be performed using the captured image 10 captured before and after the movement of the vehicle by using only the other camera (for example, the right camera). In this case, the camera on one side can be calibrated by processing similar to the case where a monocular camera is used as the in-vehicle camera 101.

In addition, by acquiring the two captured images 10 captured by the stereo camera at different timings, the same divided regions of the two captured images 10 captured at different times may be matched. For example, the feature point equalization detection unit 102 sets the individual threshold values after detecting the feature points from the divided regions obtained by dividing two captured images 10 which are acquired at an initial timing. The feature point equalization detection unit 102 then detects the feature points by using the individual threshold values set at the initial timing for the divided regions obtained by dividing the two captured images 10 acquired at the next timing. The three-dimensional distance recognition unit 106 is capable of more accurately recognizing three-dimensional distances in the outside world by using, in the subsequent detection of feature points, the individual threshold values which were first set for the captured images 10 captured twice in a short time as described.

Note that the present invention is not limited to or by the above-described embodiments, and it is obvious that various other application examples and modifications can be taken without departing from the gist of the present invention described in the claims.

For example, the above-described embodiments describe system configurations in detail and specifically in order to describe the present invention in an easy-to-understand manner, and are not necessarily limited to those having all the described configurations. In addition, it is also possible to add, delete, and replace other configurations with some of the configurations of the present embodiment.

Moreover, control lines and information lines indicate what is deemed necessary for the description, and do not necessarily indicate all the control lines and the information lines on the product. In practice, it may be considered that almost all the configurations are interconnected.

REFERENCE SIGNS LIST

10 captured image
100 image processing device
101 in-vehicle camera
102 feature point equalization detection unit
103 feature point matching unit
104 relative parameter calculation unit
105 parallax image generation unit
106 three-dimensional distance recognition unit
1021 region dividing unit
1022 feature point detection unit
1023 threshold value setting unit

The invention claimed is:

1. An image processing device, comprising:
a region dividing unit that divides each of a plurality of captured images captured by an in-vehicle camera into a plurality of divided regions;
a feature point detection unit that detects, as a feature point, a portion exceeding a threshold value for each of the divided regions;
a threshold value setting unit that sets the threshold value for each of the divided regions so as to evenly distribute the feature points detected in each of the divided regions;
a feature point matching unit that performs matching by associating the feature points detected in the plurality of captured images with each other between the plurality of captured images; and
a relative parameter calculation unit that calculates a relative parameter on the basis of the feature points associated between the plurality of captured images.

2. The image processing device according to claim 1, wherein the threshold value setting unit performs setting to increase the threshold values set for the divided regions in which the number of feature points is greater than a target value, and performs setting to decrease the threshold values set for the divided regions in which the number of feature points is less than the target value, and
the feature point detection unit detects the feature points by using the threshold values set by the threshold value setting unit.

3. The image processing device according to claim 2, wherein the region dividing unit performs division by increasing the number of divisions of the captured images and reducing the size of the divided regions so that at least one feature point is detected for each divided region.

4. The image processing device according to claim 3, wherein the region dividing unit changes the positions and sizes of the regions into which the captured image is to be divided according to the position in which the in-vehicle camera is mounted.

5. The image processing device according to claim 4, wherein the region dividing unit divides the captured image of a portion predicted to have many feature points by using a size smaller than that of a portion predicted to have few feature points.

6. The image processing device according to claim 4, wherein the region dividing unit divides the plurality of captured images using different sizes on the basis of a prediction result of feature points corresponding to three-dimensional positions in the outside world detected from a plurality of captured images captured by the in-vehicle camera as the vehicle moves.

7. The image processing device according to claim 5, wherein the feature point matching unit performs matching by associating the feature points in each divided region which have the same position in the plurality of captured images.

8. The image processing device according to claim 6, wherein, in a case where the in-vehicle camera is a stereo camera, the relative parameter calculation unit uses, as references, the axial position and the axial angle of one of two cameras constituting the stereo camera when the one camera captures the captured image, and uses, as the relative parameters, the relative axial position and the relative axial angle of the other camera when the other camera captures the other captured image.

9. The image processing device according to claim 6, wherein, in a case where the in-vehicle camera is a monocular camera, the relative parameter calculation unit uses, as references, the axial position and the axial angle of the monocular camera at the time of capturing the one captured image among the plurality of captured images captured by the monocular camera as the vehicle moves, and uses, as the relative parameters, the relative axial position and the relative axial angle of the monocular camera at the time of capturing the other captured image.

10. The image processing device according to claim 8, further comprising:
   a parallax image generation unit that generates a parallax image of the plurality of captured images on the basis of the relative parameters; and
   a three-dimensional distance recognition unit that recognizes three-dimensional distances in the outside world on the basis of the parallax image.

11. An image processing method, comprising processing for:
   dividing each of a plurality of captured images captured by an in-vehicle camera into a plurality of divided regions;
   detecting, as a feature point, a portion exceeding a threshold value for each of the divided regions;
   setting the threshold value for each of the divided regions so as to evenly distribute the feature points detected in each of the divided regions;
   associating the feature points detected in the plurality of captured images with each other between the plurality of captured images; and
   calculating a relative parameter on the basis of the feature points associated between the plurality of captured images.

* * * * *